Dec. 31, 1935.   G. W. J. BRADLEY   2,026,456
PROCESS FOR THE RECOVERY OF SULPHURIC ACID AND RESINS
Filed Feb. 9, 1934

INVENTOR
George W. J. Bradley
BY
Sturtevant + Mason
ATTORNEYS

Patented Dec. 31, 1935

2,026,456

UNITED STATES PATENT OFFICE 2,026,456

PROCESS FOR THE RECOVERY OF SULPHURIC ACID AND RESINS

George William James Bradley, Parkgate, near Rotherham, England

Application February 9, 1934, Serial No. 710,584
In Great Britain February 27, 1933

9 Claims. (Cl. 196—148)

The present invention relates to a process and apparatus for treating acid tars from the purification of benzole or other liquid hydrocarbons for the recovery of the acid and the resinous and other bodies.

In processes for refining benzole and other liquid hydrocarbons it is customary to agitate them with strong sulphuric acid of suitable strength according to the degree of purity desired in the finished products. After agitation the mixture is allowed to stand when the acid sinks to the bottom in the form of a dark tarry liquid containing sulphuric acid, entrained hydrocarbons, resinous substances and the like and this acid mixture is known and is referred to hereinafter as "acid tar".

The tar contains, in addition to a considerable quantity of acids, dissolved and entrained benzole and resins, some of which may be sufficiently valuable to warrant recovery.

A known process for the regeneration of the acid tar is to run the tar into suitable tanks and blow steam through the mass. This produces a dilute solution of sulphuric acid suitable for use in an ammonium-sulphate plant together with a porous carbonaceous layer which solidifies on cooling and is generally burnt or tipped.

The disadvantage of the steaming process is that the heating action of the live steam causes the strong sulphuric acid to act immediately on the resins, whereby the latter are oxidized and charred, whilst the acid is reduced to sulphur dioxide, before the condensation of the steam can bring about dilution of the acid to such a degree that the above destructive action is prevented. Moreover, a proportion of the acid and the entrained hydrocarbons remain in the resins.

It has also been proposed to dilute the acid tar after separation from the purified hydrocarbons with cold water, and to heat the mixture by exposure to direct contact with steam. The separation produced by this process is, however, again incomplete, and it is found that the regenerated sulphuric acid is very impure, while the resins are still largely oxidized. It is believed that the disadvantages consequent on the known methods of separation mentioned above arise from the fact that the acid tar contains the acid and the resins in an emulsified condition and none of the known processes are capable of effecting sufficiently rapid dilution of the acid to prevent the resins being attacked when the temperature is raised with consequent destruction of both the resins and the acid.

The object of the present invention is to provide an improved method of treatment and suitable apparatus for applying the same, by means of which the acid, the hydrocarbons, the resins and the like may be recovered without substantial decomposition and with minimum loss. The present invention provides a method of treatment in which all the disadvantages of the known processes are obviated.

According to the present invention we provide a process for the regeneration of the acid tar resulting from the purification of benzole or other liquid hydrocarbons by acid, in which the acid tar is introduced in a thin stream into a body of boiling water which is maintained at boiling point during the admission of the acid tar. Further features of the invention will be apparent from the following description and from the appended claims. The invention also contemplates a suitable apparatus for carrying the new process into effect.

In carrying out the process of the present invention the acid tar is run directly from the benzole agitator in a thin stream into the bottom of a suitable vessel containing a sufficient quantity of boiling water. The vessel is provided with a steam heating coil in the lower part thereof, and/or with a pipe for the admission of live steam. The bottom of the vessel also contains an outlet through which the dilute separated acid may be run off after treatment. The amount of boiling water used per unit volume of acid tar may vary from one half to one volume, though a smaller quantity of boiling water may be used according to the strength of the acid tar to be treated. For example, when treating between 100 and 150 gallons of acid tar, the quantity of water used may be between 50 and 100 gallons, the quantity of water used being fixed by the consideration that the dilution of the acid tar must be carried to such a degree that oxidation of the resins and reduction of the sulphuric acid to $SO_2$ is prevented, and 75% dilution of the acid may be considered as a safe limit.

Apparatus for carrying out the process of the present invention is shown diagrammatically in the accompanying drawing, in which Fig. 1 is a vertical section through a mixing vessel.

Figure 1:
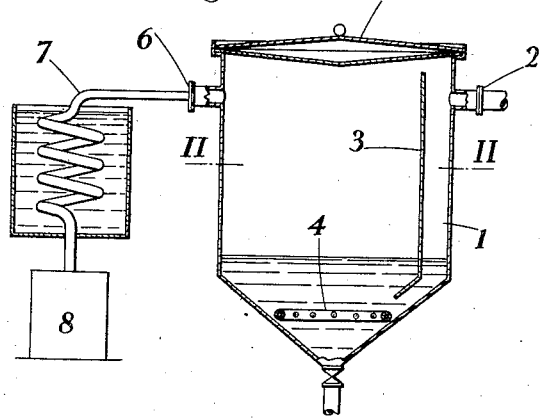
Figure 2:
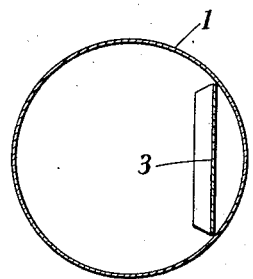
Fig. 2 is a cross-section on the line II—II of Fig. 1.

The acid tar from the benzole agitator or other source is led into the vessel 1 through the inlet 2. A partition or baffle 3 is arranged down one side of the vessel near the inlet 2, as shown, forming a channel open at the lower end and dipping beneath the surface of the water in the vessel, and the acid tar flows down this channel directly into the body of the boiling water. The water is maintained at boiling point by the admission of live steam through the perforated steam pipe 4, and is kept in a state of ebullition during the addition of the acid tar, which runs in just as it is drawn off from the agitator or other source, and which may be at any temperature from atmospheric to 50° C. according to the heat disengaged during the purification process. The initial level of the boiling water is approximately as shown. The upper part of the vessel is closed with a cover 5, which is convex downwards, in order to return any condensate on the cover to the center of the vessel, and thus keep the joint free from liquid.

The hydrocarbon vapours and steam evolved during and subsequent to the addition of the acid tar are removed through the outlet 6, Fig. 1, and passed to an external condenser 7 and a separator 8 for the condensed water-vapour, as shown diagrammatically in Fig. 1.

Figure 3:
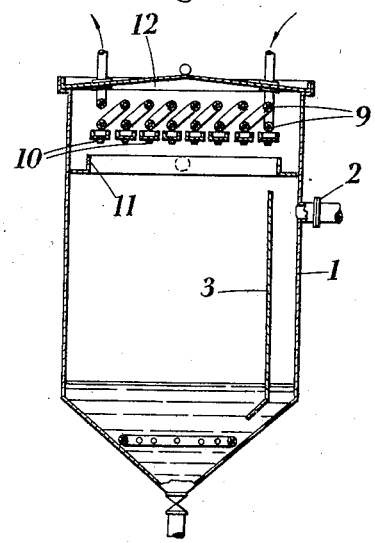
Fig. 3 shows a vertical section of a modified form of the apparatus.
Figure 4:
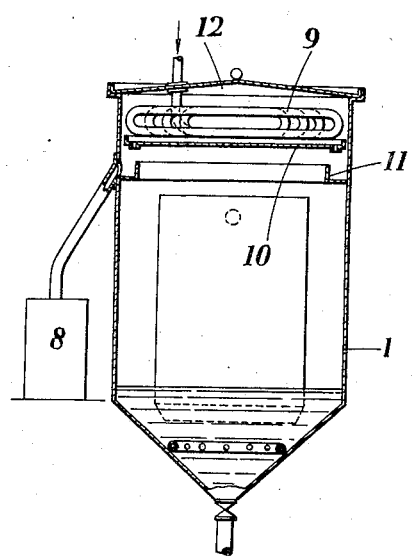
Fig. 4 shows a vertical section of the vessel of Fig. 3 in a direction perpendicular to the section of Fig. 3.

In the modified form of apparatus shown in Figs. 3 and 4, a bank of cooling coils 9 is suspended on a framework 12 in the upper part of the vessel 1, which may otherwise be open to the atmosphere. Suitable connections are provided for supplying a cooling fluid, e. g. water, to the cooling coils 9. Drip trays 10 are fixed beneath each coil to catch the condensate therefrom and deliver it to the collecting channel 11 round the interior of the vessel, from whence it passes to the separator 8 as before.

The gradual admixture of the acid tar with a comparatively large volume of boiling water results in an immediate dissemination of the acid tar throughout the body of the water, causing rapid dilution of the acid to such a degree that no charring, oxidation or other destructive action takes place on the resinous constituents and consequently there is no loss of acid by a reduction to $SO_2$. The action is further facilitated by the rapid evolution of the vapours from the entrained hydrocarbons by the heat of the water, which evolution assists in keeping the body of the liquid well mixed and also effects mechanical disintegration of the acid tar in the liquid, permitting rapid access of the water to the acid and thereby effecting the desired rapid dilution.

The resins are quickly separated and if the heating of the mixture is discontinued shortly after the complete addition of the acid tar, the resinous and other bodies collect as an upper liquid layer on the body of dilute acid and may be skimmed off or otherwise removed, and then neutralized by aqueous ammonia or other suitable alkaline solution when they are recovered as an amber or dark brown mass ready for further treatment.

If, however, it is desired to recover the resins in a solid form, the diluted acid with the upper resinous layer may be steamed in the vessel by the admission of live steam from the steam pipe already referred to, for a sufficient length of time to ensure the solidification of the resinous layer, which is accomplished without appreciable evolution of sulphur dioxide. The length of the steaming, is from two to three hours according to the composition of the resins, and this additional steaming process serves to drive off any remaining hydrocarbons contained in the resins. After cooling the diluted acid may be drained off from the bottom of the vessel and the solid resinous residue broken up and removed.

The dilute acid from the lower layer is found to be substantially free from contamination by organic matter and may be concentrated or used directly in other processes requiring dilute acid. The percentage of the acid recovered naturally depends on the character of the benzole washed, and on the strength of the acid employed per unit volume of benzole, but the average quantity recovered in the process of the present invention varies from 50 to 75% of that originally employed.

I declare that what I claim is:—

1. Process for the recovery of sulphuric acid from the acid tar resulting from the purification of liquid hydrocarbons by sulphuric acid, in which said acid tar is introduced in a thin stream into a body of boiling water which is maintained in a state of ebullition during the admission of said acid tar.

2. Process for the recovery of sulphuric acid and resinous substances form the acid tar resulting from the purification of liquid hydrocarbons by sulphuric acid, in which said acid tar is introduced in a thin stream into a body of boiling water sufficient to ensure that no destructive action takes place on the said resinous substances in said acid tar, and said water is maintained at boiling point during the admission of said acid tar.

3. Process for the recovery of sulphuric acid from the acid tar resulting from the purification of liquid hydrocarbons by sulphuric acid, in which said acid tar is introduced in a thin stream into a body of boiling water which is maintained at boiling point during the admission of said acid tar, the quantity of boiling water employed per unit volume of acid tar being between one half and one volume.

4. Process for the recovery of sulphuric acid from the acid tar resulting from the purification of liquid hydrocarbons by sulphuric acid, in which the said acid tar is added in a thin stream to a body of boiling water sufficient to dilute the acid to at least 75% of its original strength, said water being maintained in a state of ebullition during the admission of the said acid tar.

5. Process for the recovery of sulphuric acid from the acid tar resulting from the purification of liquid hydrocarbons by sulphuric acid, in which the said acid tar is added in a thin stream to a body of boiling water which is maintained in a state of ebullition during the admission of said acid tar, the quantity of water being not less than one-half volume per unit volume of acid tar, and steam is subsequently blown through the mixture.

6. In a process for the recovery of sulphuric acid from the acid tar resulting from the purification of liquid hydrocarbons by sulphuric acid, the following sequence of steps:—introducing the acid tar in a thin stream into a body of boiling water in the ratio of one half to one volume of water per unit volume of acid tar, maintaining said water in a state of ebullition during the admission of said acid tar by blowing steam therethrough, thereby producing a separation of said acid tar into dilute acid and a resinous layer and finally steaming said resinous layer to cause the solidification thereof.

7. A process for the recovery of sulphuric acid from the acid tar produced in the purification of benzole hydrocarbons by sulphuric acid, comprising passing the acid tar in a thin stream into a body of boiling water, such that said acid is diluted sufficiently to prevent decomposition thereof, and maintaining the mixture in a state of ebullition during the admission of said acid tar.

8. A process for the recovery of sulphuric acid and resins from the acid tar produced in the purification of benzol hydrocarbons by sulphuric acid, comprising passing the acid tar in a thin stream into a body of boiling water in the ratio of one half to one volume of water per unit volume of acid tar, maintaining said water in a state of ebullition during the admission of said acid tar by blowing steam therethrough, thereby producing a separation of said acid tar into dilute acid and a resinous layer, and steaming said dilute acid and said resinous layer to cause solidification of said resins.

9. A process for the recovery of sulphuric acid from the acid tar produced in the purification of benzole and like hydrocarbons by sulphuric acid, comprising introducing the acid tar in a thin stream below the surface of a body of boiling water, in the ratio of one-half to one volume of water per unit volume of acid tar, and maintaining the water at boiling point during the admission of the acid tar.

GEORGE WILLIAM JAMES BRADLEY.